Oct. 4, 1960 M. T. DERBY 2,954,602
CLIP FASTENER
Filed April 28, 1958
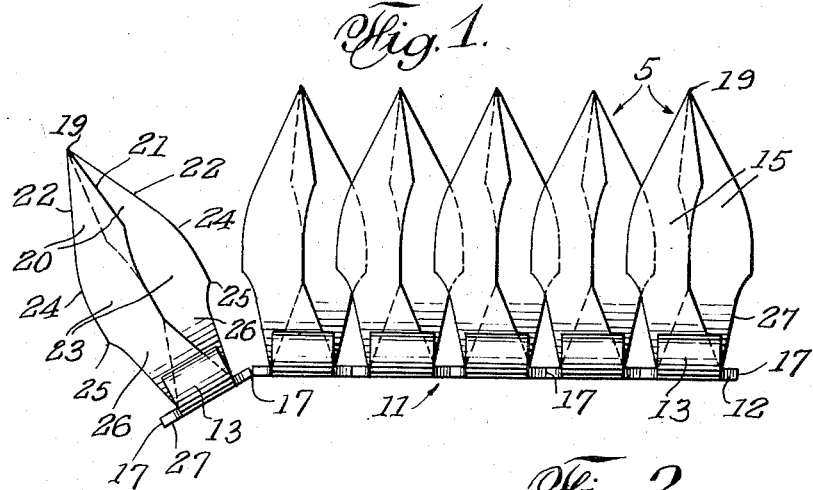
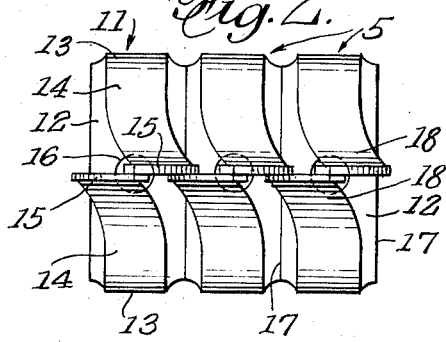
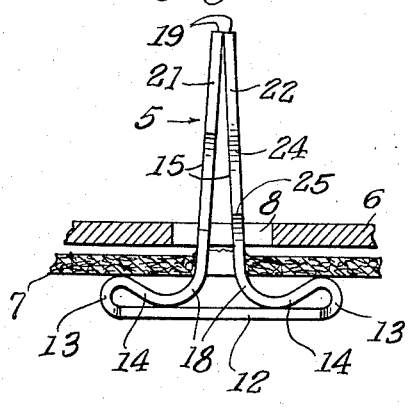
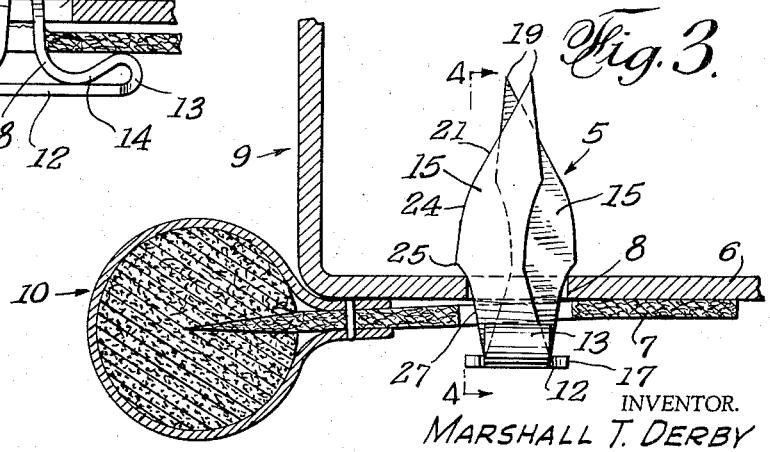
INVENTOR.
MARSHALL T. DERBY
BY C. G. Stratton
ATTORNEY United States Patent Office 2,954,602
Patented Oct. 4, 1960

2,954,602

CLIP FASTENER

Marshall T. Derby, Downey, Calif., assignor to C.I.P. Co., doing business as California Industrial Products, South Gate, Calif., a corporation of California Filed Apr. 28, 1958, Ser. No. 731,377

2 Claims. (Cl. 29—193.5)

This invention relates to a fastener of the clip type, the same having a variety of uses among which is to resiliently hold a member in position against a panel that may be relatively thick or thin, as the case may be. The present fastener is particularly adapted for fastening weather stripping, such as the wind cord of an automobile, to a door post or other comparable part.

An object of the present invention is to provide a fastener that is advantageously provided in the form of a strip of twenty or more clips or fasteners in such overlapping arrangement that the strip is shorter than the sum of the widths of the clips comprising the strip.

Another object of the invention is to provide a fastener that cleanly shears material into which it is pushed, rather than pushing the material aside to leave rough and burry edges around the fastener. Thus, the fastener herein provided may simply be pushed into place with complete assurance that the same will properly seat, since there would be no interference from rough edges therearound.

A further object of the invention is to provide a shear type of fastener, as above contemplated, that may enter the holes in two or more superimposed plates or members even when there is substantial misalignment of the holes. Hence, the fastener affords a wide range of latitude or tolerance in hole alignment.

A still further object of the invention is to provide a push type of fastener that holds equally well with thin as well as thicker members, the same being adapted to efficiently connect two or more plate-like members regardless of thickness variation, providing the thickness is within the range or capacity of the fastener.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawing merely shows and the following description merely describes, one embodiment of the present invention, which is given by way of illustration or example only.

In the drawing, like reference characters designate similar parts in the several views.

Fig. 1 is a side elevational view of a portion of a strip showing a plurality of fastener clips according to the present invention, one of the clips being angularly bent from the strip, as when the same is being removed therefrom.

Fig. 2 is a top plan view of a portion of said strip.

Fig. 3 is a fragmentary cross-sectional view showing one of the clips or fasteners in operative position, connecting together two plate members, one of which is penetrable by the clips.

Fig. 4 is a cross-sectional view as taken on the line 4—4 of Fig. 3.

The present fastener 5 is shown as connecting or securing together a metal member 6 and a non-metal, penetrable member 7, although it will be understood that said fastener may connect two or more metal members. The member 6 is provided with a preformed hole 8 as would each of the metal members, if only metal members were connected or secured by the clips. In Figure 3, the member 6 is shown as the wall of a door post 9, as used in automobiles, and the penetrable member 7 is shown as the paper web of a weather strip or wind cord 10 that is secured by clips 5 to the door post in such manner that a door may seal thereagainst. Of course, the foregoing is exemplary of two members that may be connected by the present clips.

As shown in Figs. 1 and 2, the clips or fasteners 5 are preferably arranged in the form of a strip 11 from which they are successively removed preparatory to their being operatively applied.

The clips are formed to be resilient and, to this end, may be made of annealed, heat-treated steel sheet of such thin gauge that the sheet strip from which formed has elasticity or resilience in a direction transverse to the plane of the sheet. This will later become apparent.

Each clip fastener integrally comprises a base web 12, bends 13 on the opposite ends of said web, return base portions 14 extending from said bends 13 and superimposed over the web 12, and piercing plate parts 15 extending from the ends of the base portions 14 and extending in general parallelism transversely to the plane of the base web 12.

The web 12 is shown as generally rectangular and is provided with a central aperture 16 that serves, in connection with a pusher type of applying tool, to center the fastener on the tool while the fastener is being applied. The rectangular form provides side edges 17 defined by lines scored into said base web and it is along said edges that the fasteners are separably connected in strip form, as shown. Merely bending a fastener out of the plane of the strip, as shown in Fig. 1, effects removal thereof preparatory to operative application.

The bends 13 are made as tight as possible commensurate to the ability of the strip steel sheet to be bent without rupture. Since spring steel is used, the bend, ordinarily, cannot be as tight or flat as would be the case with softer metal. In any case, as shown in Fig. 4, the bends 13 provide a smooth finish for the opposite ends of the base web to obviate said ends cutting into a paper member 7, for instance.

The return portions 14 preferably are directed to bear against the web 12, thereby providing the base of the fastener with strength and ability to resist flexure as might distort the same.

The piercing plate parts 15 extend from said return portions 14 in preferably curved bends 18 that are sufficiently sweeping as to obviate the forming of rupture-inducing corners. It will be noted from Fig. 4 that the curved bends 18 terminate substantially at the level of the tops of the bends 13. Thereabove, the plate parts 15 are preferably flat. While said parts 15 are shown as slightly separated where they extend from bends 18, the separation space is merely nominal and may be either smaller yet or entirely missing. Hence, to all intents and purposes, the plate parts 15 are parallel, side-by-side parts of the fastener and extend in a direction transverse to the base web 12 with the planes of said parts 15 transversely intersecting the plane of said web.

Each plate part 15 has a terminal point 19 from which the same widens into a triangular end 20 defined between an inner edge 21 and an outer shear edge 22. Said end extends to an intermediate and laterally offset plate portion 23, the outer shear edge 22 being extended along an outer curved edge 24 and terminating in a shoulder 25 that is directed toward the base of the fastener. An extension 26 from the portion 23 to the curved bends 18 is directed angularly from the offset portion 23 back to a central position with respect to the base web 12.

As can be seen, the two plate parts 15 of each fastener are oppositely formed. Thus, the points 19 coincide, the shear edges 22 and their curved extensions 24, as well as the shoulders 25, are disposed on opposite sides of the two side-by-side plate parts. Hence, these two parts combine to provide a spear-headed fastener part in which the two plates forming said part are capable of scissors action when compression is applied to the opposite edges 24.

It will be clear that the spear-headed part thus provided may be entered into a hole 8 that is smaller diametrally than the width across said edges 24. The edges 24 serves as cams that bias the parts 15 to flex oppositely inward toward each other or laterally, until the shoulders 25 pass through the hole. Then, as seen in Fig. 3, the parts 15 are released to partly return toward their initial spread condition with the shoulders 25 preventing retraction of the spear from the hole. Therefore, the fastener is firmly secured to a member 6 having such a hole 8. The spear may pass through two or more such holes and will do so even if there is material misalignment of the holes, because the thickness of the spear is only twice the thickness of the sheet from which the fastener is made.

If one of the members through which the spear is passed comprises an imperforate member 7 capable of being perforated by the pointed spear, it will be clear, as shown in Figs. 3 and 4, that the points 19 will penetrate such a member and that the shear edges 22 and 24 will so cut or slice therethrough as to dislodge a minimum of the material of member 7.

From what has been herein disclosed, it will be evident that a simple push on the base of the fastener will properly insert the same in operative position, nothing else being required to insure firm positioning of the fastener in such position.

It will be realized that considerable latitude in size and misalignment of holes and thickness of plates being fastened may be present with assurance of proper application of the fastener.

With particular reference to Figs. 1 and 2, it will be seen that the plate parts 15 on one side of each fastener of the strip 11 overlap the parts 15 on the opposite side. Thus, although the width of the fasteners across the edges 24 is greater than the width of the base web 12, the length of strip 11 is only the sum of the latter widths, thereby saving considerable length of strip 11 over a length that would be the sum of the widths across edges 24.

Because of the flare of the opposed edges 27 between shoulders 25 and where the extensions 26 connect to the bends 18, the fastener is firmly seated in fastening position, the spreading bias of the parts 15 causing said edges 27 to draw the fastener snugly into position.

While the foregoing specification illustrates and describes what I now contemplate to be the best mode of carrying out my invention, the construction is, of course, subject to modification without departing from the spirit and scope of my invention. Therefore, I do not desire to restrict the invention to the partciular form of construction illustrated and described, but desire to cover all modifications that may fall within the scope of the appended claims.

Having thus described my invention, what I claim and desire to secure by Letters Patent is:

1. A strip formed of a plurality of clips connected together by their bases comprising: a plurality of clips having folded base portions narrower than plate-like piercing portions, the base portions extending transversely of the length of said strip and the plate-like portions projecting normal to the center line of the strip, and in part, overlying the plate-like portions of the clips on each side, the side edges of the bases of the clips being connected together in a readily severable manner, the length of said strip before severance of the clips from one another being less than the sum of the widths of the separated clips.

2. A strip formed of a plurality of connected clips, as set forth in claim 1, in which the folded base portions of the clips include flat portions extending transversely across the strip and secured in readily severed edge abutment with the edges of the base portions of the clips on either side, each end of the flat portion of the bases being formed with return bends of less width than said flat portions of the bases bent upwardly and sidewardly to form the plate-like portions of greater width than the base portions.

References Cited in the file of this patent

UNITED STATES PATENTS

| | | |
|---|---|---|
| 2,003,448 | Kruse | June 4, 1935 |
| 2,409,966 | Voity | Oct. 22, 1946 |
| 2,433,914 | Lang | Jan. 6, 1948 |
| 2,620,537 | Gobin-Daude | Dec. 9, 1952 |

FOREIGN PATENTS

| | | |
|---|---|---|
| 829,099 | France | Mar. 14, 1938 |